US006363870B1

(12) United States Patent
King

(10) Patent No.: US 6,363,870 B1
(45) Date of Patent: Apr. 2, 2002

(54) METHOD AND SYSTEM FOR APPLYING LIQUID FERTILIZER TO A FORESTRY PLANTING SITE

(76) Inventor: Thomas P. King, 16190 Forest Glen Ct., Punta Gorda, FL (US) 33982

( * ) Notice: Subject to any disclaimer, the term of this patent is extended or adjusted under 35 U.S.C. 154(b) by 0 days.

(21) Appl. No.: 09/553,527

(22) Filed: Apr. 20, 2000

Related U.S. Application Data

(60) Provisional application No. 60/130,760, filed on Apr. 23, 1999.

(51) Int. Cl.[7] .............................................. A01C 23/00
(52) U.S. Cl. ....................................... 111/121; 111/127
(58) Field of Search ................................ 111/120, 118, 111/127, 100, 101, 102, 200, 900, 915, 121

(56) References Cited

U.S. PATENT DOCUMENTS 6,006,953 A * 12/1999 Newson et al. ............. 222/334

* cited by examiner

*Primary Examiner*—Christopher J. Novosad
(74) *Attorney, Agent, or Firm*—William E. Noonan

(57) ABSTRACT

A system and method are disclosed for dispensing liquid fertilizer to a forestry planting site of the type normally found in a commercial forestry operation. One or more liquid fertilizer accommodating tanks are mounted on a vehicle such as a plow, a planter or other mobile equipment used in the tree farming industry. Liquid fertilizer is dispensed at selected locations along the site. Typically, fertilization is performed contemporaneously with another task such as cultivating, tilling, subsoiling or planting.

7 Claims, 5 Drawing Sheets

METHOD AND SYSTEM FOR APPLYING LIQUID FERTILIZER TO A FORESTRY PLANTING SITE

RELATED APPLICATION

This application claims the benefit of U.S. Provisional Patent Application Serial No. 60/130,760 filed Apr. 23, 1999.

FIELD OF THE INVENTION

This invention relates to a method and apparatus for applying liquid fertilizer in planting and, more particularly, commercial forestry applications. The invention specifically discloses the application of liquid fertilizer to a forestry planting site during plantation establishment.

BACKGROUND OF THE INVENTION

Traditionally, forestry planting sites have been fertilized aerially using solid fertilizer. This is typically an expensive, time consuming and fairly inefficient process. An airplane cannot deliver fertilizer to a forestry bed with pinpoint accuracy. In most cases, a significant amount of fertilizing material is wasted.

Some tree planting operations utilize tractor pulled spreaders to dispense solid fertilizer over the tree seedling beds. This technique usually requires that the bed first be plowed or otherwise cultivated. A tractor then pulls a spreader across the cultivated bed to dispense the fertilizer. Finally, the seedlings are planted. This process is incredibly time, equipment and labor intensive. The numerous passes required to complete the planting can result in enormous expense. Solid fertilizers are also fairly heavy and bulky. This makes them inconvenient to handle, transport and dispense. Moreover, not only is the amount of fertilizer required to complete a job unnecessarily large, it can also cause serious environmental concerns.

To date, liquid fertilizers have been utilized in agriculture planting exclusively. Normally, the liquid fertilizer is dispensed on a field by a sprayer. The nature and volume of most agricultural products makes pinpoint application of liquid fertilizers impractical and undesirable. To date, such fertilizers have not been used in commercial forestry or similar operations.

SUMMARY OF THE INVENTION

It is therefore an object of this invention to provide a system for applying liquid fertilizer in a precisely controlled manner to a seedling bed in a commercial tree farm.

It is a further object of this invention to provide a method and apparatus for dispensing liquid fertilizer in an efficient, precisely controlled and accurate manner to a microsite such as a tree seedling bed so that considerably less fertilizer is needed to adequately fertilize the site.

It is a further object of this invention to provide a technique for fertilizing forestry beds that is very efficient and which saves considerable money, labor and material.

It is a further object of this invention to provide a method for fertilizing forestry beds that is much more efficient than conventional fertilizing techniques.

It is a further object of this invention to provide a system of fertilizing a forestry bed that eliminates the weight, cost, waste, handling and transportation difficulties often associated with conventional solid fertilizers.

It is a further object of this invention to provide a system for fertilizing forestry beds that significantly improves the yield of the bed.

It is a further object of this invention to provide a system for fertilizing a commercial forestry site that significantly reduces application costs.

It is a further object of this invention to provide a system for fertilizing tree farms that is much more environmentally friendly then conventional fertilizing techniques.

This invention results from a realization that seedling beds in a tree farm or similar commercial forestry operation may be fertilized much more quickly, efficiently and inexpensively by applying a liquid fertilizer to the seedling bed or other plantation site more or less contemporaneously with cultivation of the site or planting of the seedling. More particularly, the application of liquid fertilizer may be performed by a dispensing unit that is mounted to a bedding plow, a tree planter or other standard tree farming equipment (e.g. ripper, subsoiler, combination plow or spot cultivator). In this way, fertilizer may be applied while the vehicle is performing its conventional task. This saves substantial equipment and labor costs and allows the fertilizer to be dispensed with pinpoint accuracy so that little, if any, fertilizer is wasted. The beneficial results are accomplished primarily because the invention employs liquid fertilizer rather than solid fertilizer, which has been used exclusively to date in commercial forestry operations.

This invention features an apparatus for fertilizing a forestry planting site. The apparatus includes a vehicle or other mobile piece of forestry equipment that is driven or drawn through the forestry planting site to perform a conventional operation other than fertilizing the site. A liquid fertilizer accommodating container is mounted to the vehicle. A conduit is communicably attached to the container and mounted to the vehicle. A dispensing nozzle is carried by a distal end of the conduit generally beneath the vehicle. The nozzle is disposed toward an area of the site to be fertilized. Pump means operably innerconnect the conduit and the container for selectively pumping liquid fertilizer from the container and through the conduit such that the pumped liquid fertilizer is dispensed from the conduit through the nozzle and onto a selected area of the planting site.

In a preferred embodiment, the container may include one or multiple tanks. In embodiments wherein a pair of tanks are used, the fertilizer may include a two-part liquid fertilizer with each part of the fertilizer accommodated in a respective one of the tanks. In such cases, a respective conduit is connected to each of the tanks. Preferably, each conduit includes a flexible hose or other tubular member.

The conduit may be mounted to the vehicle and the dispensing nozzle may be located in various selected locations on the vehicle so that particularly desired fertilizing applications are achieved. For example, the fertilizing apparatus may be mounted to various types of site preparation plows. Such plows are typically pulled by a tractor through a field to cultivate a site. Various types of disk, coulter and ripping implements may be employed in such plows. By positioning the dispensing nozzle(s) at selected locations beneath the frame of the plow, the liquid fertilizer may be dispensed at selected depths in the cultivated site. An appropriate sensor mechanism and control switch may be utilized to turn the pump on and off so that fertilizer is discharged from the nozzle at predetermined intervals. The sensor may comprise a timer and/or a speed sensing mechanism that operates the switch in accordance with calibrated parameters.

This invention also features a method of dispensing liquid nutrient to a forestry planting site. The liquid nutrient is contained within a tank or other container mounted to a vehicle designed to travel through the site. While the vehicle performs a conventional cultivating or planting task (which task is not fertilizing), liquid fertilizer is pumped at predetermined or speed dependent time intervals through a conduit connected to the container. The fertilizer is discharged through a nozzle end of the conduit and onto a selected portion of the site. This enables liquid fertilizer to be directed with pinpoint accuracy to selected portions of the site proximate the tree seedlings being fertilized.

The liquid fertilizer may be dispensed along the site for a predetermined distance prior to and following the location of the seedling. The liquid fertilizer may be dispensed at various depths within a bed or other subsoiled site. This is accomplished typically by mounting the conduit at predetermined locations on the vehicle. For example, on a plow that employs a subsoiling ripper, the discharge nozzle may be positioned directly behind the ripper but forwardly of the trailing disks. This permits liquid nutrient to be dispensed deep within the V-shape furrow formed by the ripper. Alternatively, in a "Middle Buster" plow, which employs a centrally disposed disk arrangement having hydraulic relief, the bottom of the bed can be fertilized again by placing the nozzle proximate the central disk arrangement. In a standard bedding plow, the fertilizer may be dispensed primarily proximate the top of the bed by positioning the conduits so that the discharge nozzle is located between or even behind the standard opposing groups of trailing disks. In alternative embodiments, the positioning of the nozzle can be adjusted so that selected fertilizing patterns and results may be achieved.

BRIEF DESCRIPTION OF THE DRAWINGS

Other objects, features and advantages will occur from the following description of a preferred embodiment and the accompanying drawings, in which.

Figure 1:
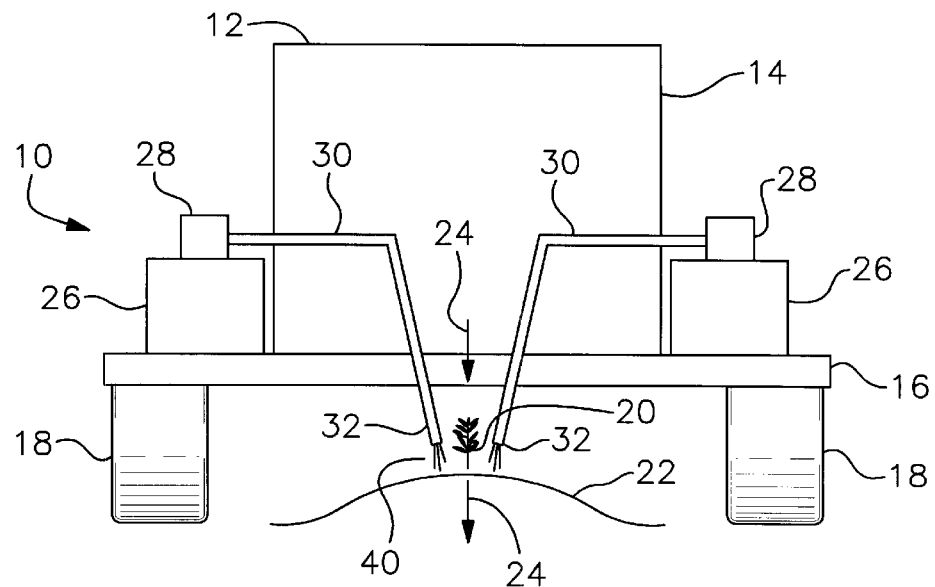
FIG. 1 is an elevational, rear end view, partly in schematic, of a tree planting apparatus carrying a system for dispensing liquid fertilizer onto a forestry planting site in accordance with this invention.

There is shown in FIG. 1 a liquid fertilizer dispensing apparatus 10 that is mounted to an automatic tree planter 12.

It should be understood that the tree planter is a conventional machine that plants tree seedlings in a manner that will be known to those skilled in the art. More particularly, the tree planter employs a body 14 having details that are not disclosed herein. The body is mounted on a standard frame 16. Wheels 18 are mounted beneath the frame in a conventional manner. Planter 12 is driven longitudinally along the rows of a tree seedling bed and the apparatus plants seedlings 20 in the bed 22, as indicated by arrows 24. Once again, this process is well known to those skilled in the art.

The present invention involves the application of liquid fertilizer directly to bed 22 or some other forestry planting site so that the seedling receives its required nutrients. To date, solid fertilizers have been spread by aerial means and mechanical spreaders. As previously described, this has resulted in a significant amount of waste and undue expense. In the present invention, liquid nutrient is delivered to a microsite with pinpoint and predetermined accuracy so that waste is virtually eliminated.

In particular, system 10 delivers a two-part liquid fertilizer of the type manufactured by Douglas™. Nonetheless, it should be understood that the system of this invention is also intended to cover single part fertilizers as well as virtually all known liquid fertilizers that are presently used in the agricultural industry. In order to deliver the disclosed two-part fertilizer, system 10 includes a pair of fertilizer accommodating tanks 26. These are plastic tanks having a size and construction suitable for accommodating a selected volume of liquid fertilizer. An electronically controlled pump 28 is mounted to each tank 26 in a known manner. A flexible hose or other type of conduit 30 extends from each pump 28 and is mounted within body 14 of planter 12. The pump communicably interconnects hose 30 with tank 26. The hoses are directed through the body of the planter in any convenient manner and the hoses are extended beneath frame 16 such that their respective nozzle ends 32 are directed at tree bed 22. It should be understood that the precise configuration of each hose 30 is not a limitation of this invention. In some versions, the hose may be directed relatively forwardly within body 14. In alternative versions, the hoses may be disposed toward the rear of the planter. It is important that the discharge or nozzle end of the hoses point downwardly toward the tree bed or other site. The nozzle itself may comprise a standard spray nozzle attached to hose 30 or simply an open discharge end of the hose.

Figure 2:
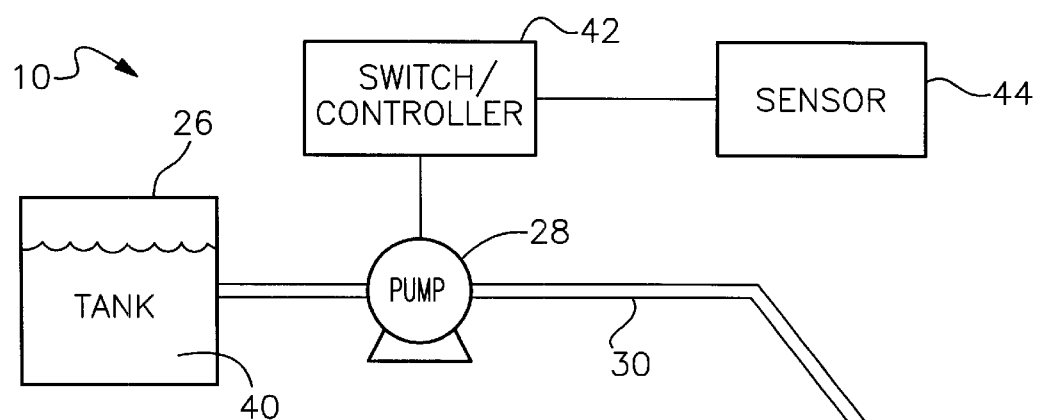
FIG. 2 is schematic view of the liquid fertilizer dispensing apparatus.

System 10 is illustrated schematically in FIG. 2. It should be noted that therein the structure associated with only a single tank pump and discharge conduit is shown. In some versions of this invention, only a single dispensing unit is utilized. In other versions (such as shown in FIG. 1) apparatus 10 includes a pair of dispensing units, each resembling the unit of FIG. 2 (with the possible exception that a single sensor and controller may be associate with both units). It should be understood that the principles exhibited in FIG. 2 apply equally to each side of the two-part system shown in FIG. 1. More particularly, tank 26 is connected communicably to pump 28. In certain versions the pump is connected directly to the tank and operated so that the liquid fertilizer 40 in tank 26 is pumped, as needed, through conduit 30 and directed to discharge nozzle 32. Pump 28 is activated and deactivated by a switch or controller 42, which may comprise a microprocessor. The switch/controller receives signals from a sensor 44. This apparatus may comprise a speed sensor that senses the speed at which planter 12 travels along the bed. Switch/controller receives a signal from sensor 44 indicating that speed and, at a preprogrammed time interval, which is calibrated according to the sensed speed, a signal is sent to pump 28, which activates the pump. This, in turn causes liquid fertilizer 40 to be pumped out of tank 26 and through conduit 30 to discharge nozzle 32. As a result, liquid fertilizer 40 is pumped through the conduit(s) and onto bed 22 in the manner shown in FIG. 1. The dispensing may also be accomplished manually utilizing a manually operated switch to start and stop the pump.

Figure 3:
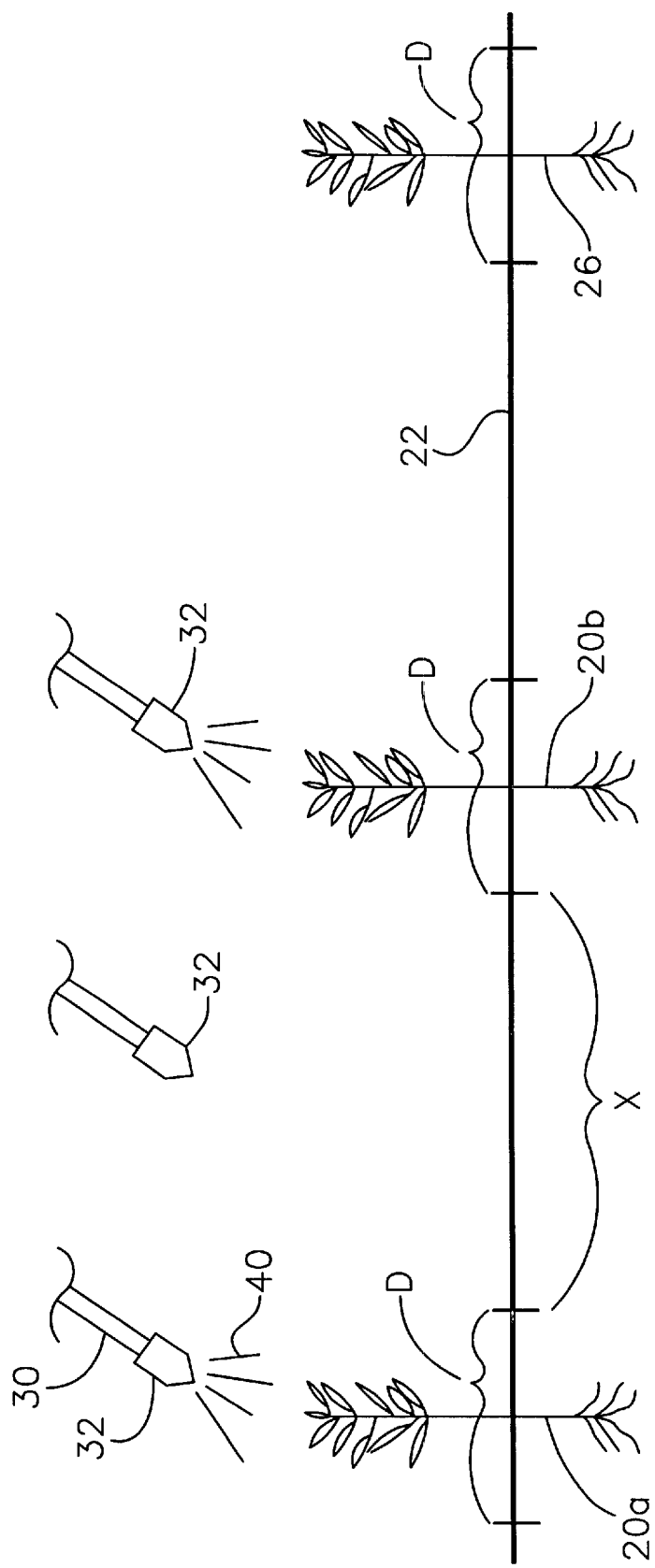
FIG. 3 is an elevational diagrammatic view of a row of tree seedlings having liquid fertilizer applied thereto in a predetermined sequence according to this invention.

The conduit(s) 30 and nozzle(s) 32 are positioned on the planter and controller 42 is programmed so that liquid fertilizer is discharged according to a predetermined sequence. Such a sequence is illustrated in FIG. 3. Therein, seedlings 20a, 20b and 20c are planted in bed 22. Immediately after each seedling is planted, conduit 30 and discharge nozzle 32, which are typically mounted on the planter slightly behind the actual planting apparatus, discharge liquid nutrient 40 onto bed 22. The liquid nutrient is dispensed for a predetermined distance D in front of and behind each of the seedlings 20a, 20b and 20c. For example, in a preferred embodiment, fertilizer is applied longitudinally along bed 22 about 6 inches on either side of each seedling. As a result, fertilizer is discharged in a pattern of strips D measuring 12 inches apiece. In a typical seedling bed, the seedlings are planted approximately 4 to 8 feet apart Accordingly, there is a distance X of approximately 3 to 7 feet between each fertilized strip D within the row. As the nozzle 32 of apparatus 10 travels across distance X, it remains shut off. Subsequently, the apparatus is activated as nozzle 32 passes over distance D in proximity to its respective seedling.

The activation and deactivation of the pump and the resulting dispensing of liquid nutrient are controlled by sensor 44 and controller 42 in the manner previously described. In particular, if sensor 44 determines that the planter 12 is moving more quickly, it directs controller 42 to activate pump 28 more frequently. Conversely, if the sensor determines that the planter is moving more slowly, controller 42 activates the pump less frequently. The programming necessary to perform this nutrient dispensing operation will be known to those skilled in the art. Programming should be performed so that liquid fertilizer is dispensed in a precise, accurately pinpointed pattern that directs an effective dosage of fertilizer to each of the seedlings and in close proximity with those seedlings.

Liquid fertilizer dispensing apparatus 10 may also be mounted to any one of a variety of forestry plows, such as in the manner shown in FIGS. 4 through 9. In each of FIGS. 4, 6 and 8, a single fertilizer tank 26 is disclosed schematically mounted to the frame. Also, in each such figure a plurality of conduit hoses 30 are illustrated having various alternative orientations designed to accomplish respective types of fertilizing.

Figure 4:
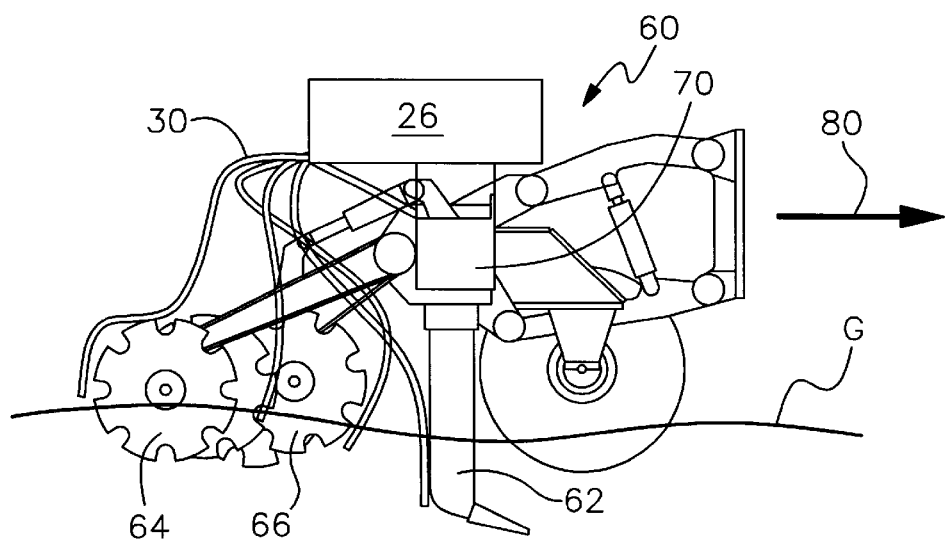
FIG. 4 is an elevational side view, partly in schematic, of the liquid fertilizer dispensing apparatus mounted to a subsoiling plow.

FIG. 4 depicts a subsoiling plow 60 employing a conventional ripper 62. The ripper is designed to cut through the ground G so that a deep furrow is formed. Two sets or groups of conventional disks 64 and 66 (having two disks apiece) trail ripper 62. As disks 64 and 66 cut through the field, they form a bed 68 that fills in and rises above furrow 67. See FIG. 5.

Figure 5:
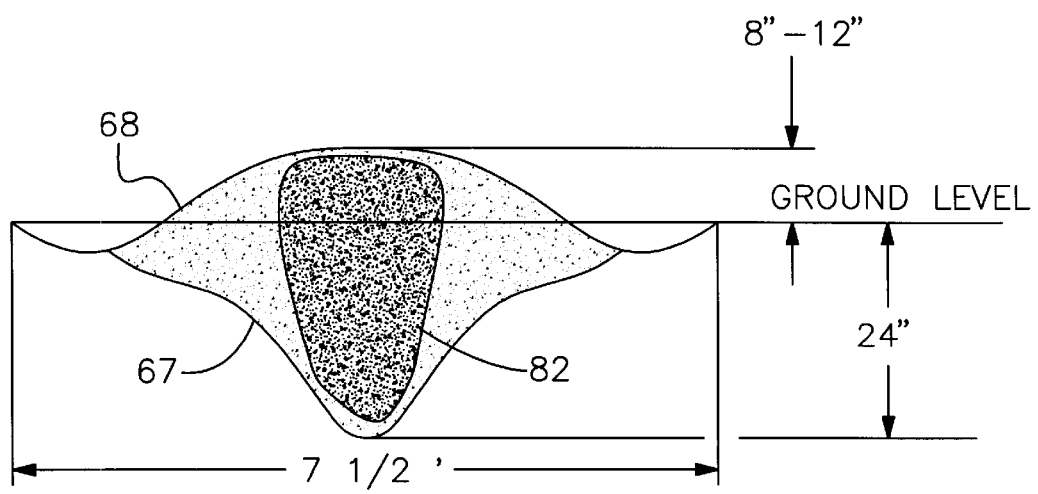
FIG. 5 is an elevational, cross sectional view of a forestry bed that has been cultivated and fertilized using the apparatus of FIG. 4.

Liquid fertilizer tank 26 is mounted on a frame component 70 of plow 60. One or more hose-like conduits 30 is communicably connected to the tank. In this version the pump omitted for clarity. Each hose is mounted in a selected location on the plow. For example, hose 30 may be mounted to ripper 62 such that its distal nozzle end is positioned within furrow 67. As the plow is pulled through the bed in the direction of arrow 80, FIG. 4, liquid fertilizer is dispensed through hose 30 at predetermined intervals and in the previously described manner. This produces a fertilizer zone 82 as shown in FIG. 5. By positioning the hose 30 immediately behind ripper 62, the zone of liquid fertilizer extends generally from the deepest point in the furrow to the upper portion of bed 68.

Conduit 30 may be mounted and repositioned at various alternative locations along the plow. For example, it may be placed in front of, between or behind disk sets 64 and 66. The further back the nozzle end of the conduit is placed, the higher in the bed the fertilizer is dispensed.

Figure 6:
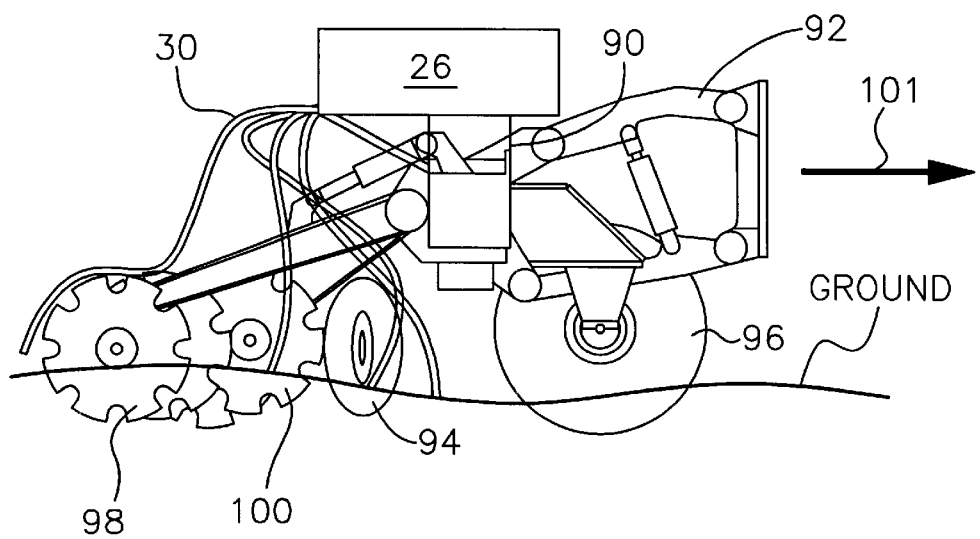
FIG. 6 is an elevational side view of an alternative plow employing a center disk arrangement and carrying the liquid fertilizer dispensing apparatus of this invention.

FIG. 6 diskless fertilizer tank 26 schematically mounted to a frame 90 of a so called "Middle Buster" plow 92. This plow includes a central disk or disk set 94 that axially trails a coulter 96, but is disposed in front of a pair of disk sets 98 and 100. This type of plow is designed to break the ground of the bed before the disks 98 and 100 are pulled through the bed in the direction of arrow 101. Plow 92 breaks up the ground between the disk sets 98 and 100 before those sets build up the bed. However, center disk arrangement 94 (which itself may comprise one or more disks) does not dig a furrow nearly as deep as the subsoiling ripper shown in FIG. 4. Instead, it forms only a shallow cut 102, shown in FIG. 2. Subsequently, after the disk sets 98 and 100 pass, a mound or bed 104 is formed.

Figure 7:
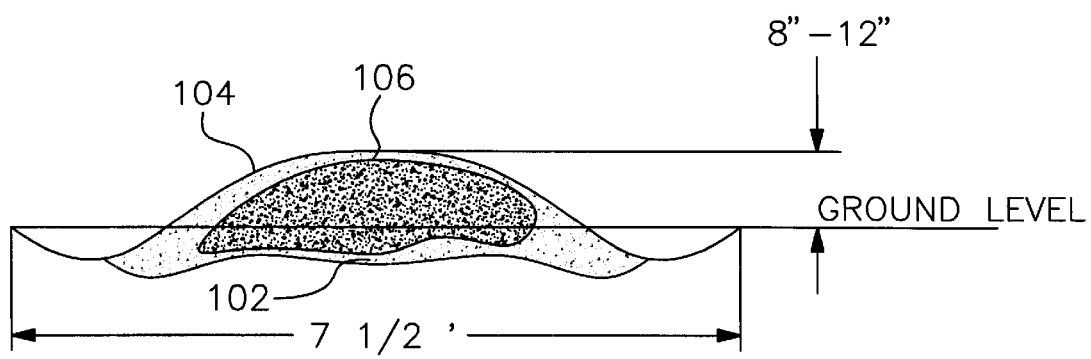
FIG. 7 is an elevational, cross sectional view of a forestry bed that has been plowed and fertilized using the apparatus of FIG. 6.

In the version of FIGS. 6 and 7, each conduit 30 is mounted to the plow by suitable brackets such that the distal nozzle end is pointed toward bed 104. Conduit 30 may be positioned at various locations, as shown in FIG. 6. By positioning the conduit 40 proximate the center disk 94 and dispensing liquid fertilizer periodically in the previously described manner, a fertilizer zone 106, FIG. 7 is formed within bed 104. Alternatively, by positioning the conduit more rearwardly, a shallower fertilizer zone is formed.

Figure 8:
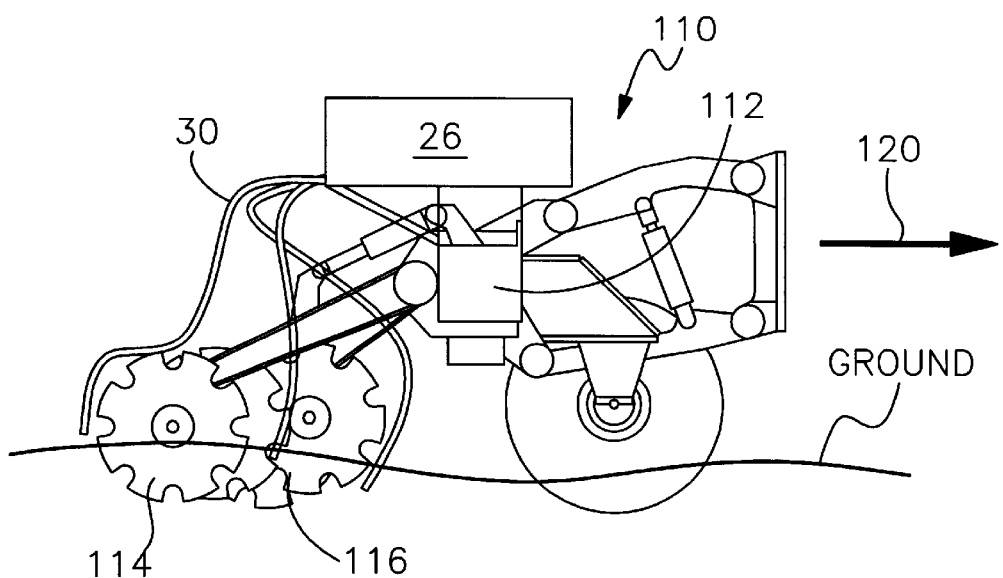
FIG. 8 is an elevational side view of a bedding plow carrying an apparatus for dispensing liquid fertilizer in accordance with this invention.
Figure 9:
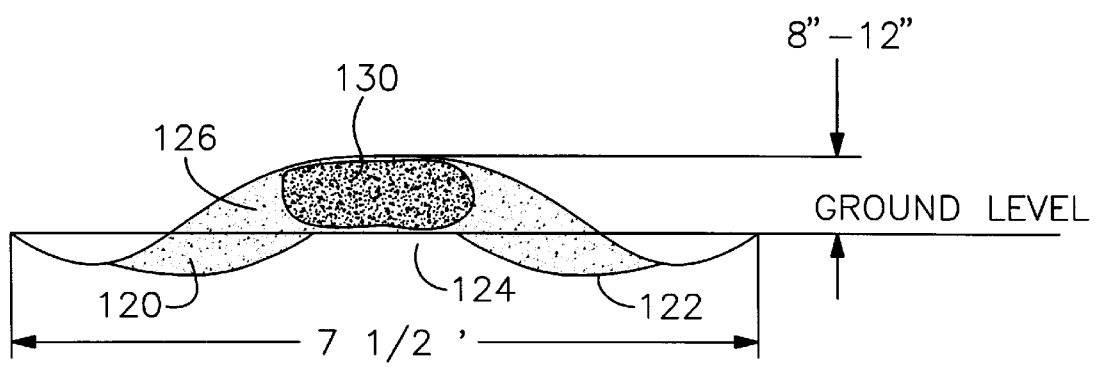
FIG. 9 is an elevational, cross sectional view of a bed that has been plowed and fertilized using the apparatus of FIG. 8.

In FIGS. 8 and 9 there is shown a standard bedding plow 110 having a frame 112 to which liquid fertilizer tank 26 is mounted. Plow 110 includes a pair of disk assemblies or sets 114 and 116 that are arranged on opposite sides of the bed. These trailing groups of disks are pulled by the plow as the plow itself is pulled by a tractor in the direction of arrow 120. In this version, no center cutting apparatus is provided. Therefore, as shown in FIG. 9, the bed profile includes a pair of recesses 120 and 122, which are formed by disk sets 114 and 116, respectively, and a central hump 124. As the plow is pulled, the disk sets 114 and 116 form recesses 120 and 122 and direct the soil into a bed 126 that covers hump 124.

Conduit 30 is operably connected to tank 26 in the manner previously described. The conduit is once again mounted to an appropriate location on the plow by brackets or otherwise, such that the distal nozzle end of the conduit is pointed toward the mound or bed 126. The dispensing apparatus is operated automatically or manually so that fertilizer is dispensed in a pattern 130 that is proximate the upper part of the bed. The fertilizer pattern may be varied in this and any of the versions of this invention by simply reprogramming the dispensing system to discharge liquid fertilizer according to an adjusted sequence.

It should be understood that the system of this invention may be utilized to fertilize a variety of commercial forestry planting sites and is not limited to beds per se. Additionally, the system may be mounted to alternative types of mechanisms used in commercial forestry such as combination plows, subsoiling rippers and spot cultivators.

Accordingly, the present invention permits liquid fertilizer to be dispensed accurately and precisely at selected points along a seedling bed. The fertilizer is not randomly sprayed, but rather is directed to a desired location. Waste is avoided and improved product yields are achieved. The fertilization process is also simplified and costs are reduced significantly. This occurs because lightweight and compact liquid fertilizer is used instead of solid fertilizers. Additionally, the fertilizer is applied while another task (cultivation, planting, etc.) is performed. Time, labor, machinery and expense are drastically reduced and efficiency is improved considerably. Furthermore, the present invention totally eliminates the use of wasteful, expensive and potentially environmentally hazardous solid fertilizers.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A system for fertilizing a forestry planting site comprising:
    a forestry vehicle that is operated through a forestry planting site to perform a conventional forestry operation other than fertilizing the site;
    a liquid fertilizer accommodating container mounted to said vehicle;
    a conduit communicably attached to said container and mounted to said vehicle, said conduit carrying a dispensing nozzle proximate a distal end thereof and generally beneath said vehicle, said nozzle being disposed toward an area of the planting site to be fertilized, at least while said vehicle is moving across that area; and
    means mounted on said vehicle for selectively pumping liquid fertilizer from said container and through said conduit such that the pumped liquid fertilizer is dispensed from said conduit through said nozzle and onto a selected area of the planting site.

2. The system of claim 1 in which said vehicle includes a plow supporting a sub-soiling ripper and a plurality of trailing disks, said discharge nozzle being positioned directly behind said ripper and forwardly of said trailing disks such that said liquid fertilizer is dispensed deeply within a furrow formed by said ripper.

3. The system of claim 1 in which said vehicle includes a plow having a frame and a centrally disposed disk arrangement with hydraulic relief interconnected between said frame and said disk arrangement, said nozzle being disposed proximate said central disk arrangement.

4. The system of claim 1 in which said vehicle includes a standard bedding plow having a frame and opposing groups of trailing disks mounted to said frame, said conduit being positioned on said frame such that said discharge nozzle is located no farther forward than said opposing groups of trailing disks.

5. The system of claim 1 in which said vehicle comprises a forestry plow having a frame and wherein said container and said conduit are mounted to said frame, said dispensing nozzle being positioned beneath said frame to dispense said liquid fertilizer at selected depths in the planting site.

6. The system of claim 1 further including means for activating and deactivating said means for pumping so that said fertilizer is dispensed from said nozzle at predetermined intervals, said means for activating and deactivating including a timer and means responsive to said timer for activating and deactivating said means for pumping at predetermined time intervals.

7. The system of claim 6 in which said means for activating and deactivating include a speed sensing mechanism and means responsive to said speed sensing mechanism for controlling the rate at which said fertilizer is dispensed.

* * * * *